(12) United States Patent
Fujimoto et al.

(10) Patent No.: US 11,608,397 B2
(45) Date of Patent: Mar. 21, 2023

(54) POLYMER MANUFACTURING METHOD

(71) Applicant: DENKA COMPANY LIMITED, Tokyo (JP)

(72) Inventors: Kosuke Fujimoto, Itoigawa (JP); Uichiro Yamagishi, Itoigawa (JP); Shogo Hagiwara, Itoigawa (JP)

(73) Assignee: Denka Company Limited, Tokyo (JP)

( * ) Notice: Subject to any disclaimer, the term of this patent is extended or adjusted under 35 U.S.C. 154(b) by 129 days.

(21) Appl. No.: 16/633,671

(22) PCT Filed: Jul. 27, 2018

(86) PCT No.: PCT/JP2018/028225
§ 371 (c)(1),
(2) Date: Jan. 24, 2020

(87) PCT Pub. No.: WO2019/022227
PCT Pub. Date: Jan. 31, 2019

(65) Prior Publication Data
US 2020/0223961 A1 Jul. 16, 2020

(30) Foreign Application Priority Data

Jul. 28, 2017 (JP) .............................. JP2017-146591

(51) Int. Cl.
| | | |
|---|---|---|
| *C08F 36/18* | (2006.01) | |
| *C08F 14/02* | (2006.01) | |
| *C08F 20/42* | (2006.01) | |
| *C08F 36/04* | (2006.01) | |
| *C08F 214/02* | (2006.01) | |
| *C08F 220/44* | (2006.01) | |

(52) U.S. Cl.
CPC .............. *C08F 36/18* (2013.01); *C08F 14/02* (2013.01); *C08F 20/42* (2013.01); *C08F 36/04* (2013.01); *C08F 214/02* (2013.01); *C08F 220/44* (2013.01); *C08F 2438/00* (2013.01)

(58) Field of Classification Search
CPC ........ C08F 36/18; C08F 220/44; C08F 20/42; C08F 36/04; C08F 214/02; C08F 14/02; C08F 248/00; C08F 2/33
See application file for complete search history.

(56) References Cited

U.S. PATENT DOCUMENTS

| | | | | |
|---|---|---|---|---|
| 2011/0136965 | A1* | 6/2011 | Murakami | C08L 53/00 525/286 |
| 2016/0017130 | A1* | 1/2016 | Yashima | C08F 36/18 524/710 |
| 2017/0058055 | A1* | 3/2017 | Lee | C07F 7/1804 |

FOREIGN PATENT DOCUMENTS

| | | |
|---|---|---|
| CN | 101263170 A | 9/2008 |
| CN | 103421149 A | 12/2013 |
| CN | 103421205 A | 12/2013 |
| CN | 104105715 A | 10/2014 |
| JP | H10-130306 A | 5/1998 |
| JP | H10-245411 A | 9/1998 |
| JP | 2003-327620 A | 11/2003 |
| JP | 2005-330446 A | 12/2005 |
| JP | 2007-039654 A | 2/2007 |
| JP | 2013-237801 A | 11/2013 |
| JP | 2015-117356 A | 6/2015 |
| JP | 2016-198426 A | 12/2016 |
| JP | 2016-210891 A | 12/2016 |
| JP | 2016198426 A | 12/2016 |
| WO | WO 2010/016523 A1 | 2/2010 |
| WO | WO-2015113114 A1 * | 8/2015 .............. C08F 30/02 |

OTHER PUBLICATIONS

Czvikovszky, "Degradation Effects in Polymers," Advances in radiation chemistry of polymers, IAEA Proceedings, 2003. (Year: 2003).*
Fundamental Molecular Science, Tokyo Kagaku Dojin, Co., Ltd., pp. 340 [4 pages total including translation pp. 1-2], (Jul. 1, 2006).
Japan Patent Office, International Search Report in International Application No. PCT/JP2018/028225 (dated Oct. 30, 2018).
Japan Patent Office, Written Opinion in International Application No. PCT/JP2018/028225 (dated Oct. 30, 2018).
International Bureau of WIPO, International Preliminary Report on Patentability in International Application No. PCT/JP2018/028225 (dated Jan. 28, 2020).
European Patent Office, Supplementary European Search Report in European Patent Application No. 18838518.1 (dated May 28, 2020).
China National Intellectual Property Administration, Office Action in Chinese Patent Application No. 201880048923.0 (dated Jun. 28, 2021).
"Isocyanate Monomer", www.karenz.jp/faq/monomer.html, pp. 1-3 (Feb. 4, 2010).
"Catalogue of Acrylic Products", *Toagosei*, pp. 1-2 (May 1, 2013).
"KarenzMOI(R)", *Showa Denko K.K.*, pp. 1-3 (Feb. 19, 2014).

(Continued)

*Primary Examiner* — Catherine S Branch
(74) *Attorney, Agent, or Firm* — Leydig, Voit & Mayer, Ltd.

(57) ABSTRACT

Disclosed are a polymer having a narrow molecular weight distribution prepared by living radical and a polymer manufacturing method comprising a step of performing living radical polymerization using 0.005 to 0.5 parts by mass of an oxygen radical scavenger per 100 parts by mass of a radical polymerizable monomer.

8 Claims, No Drawings

(56) References Cited

OTHER PUBLICATIONS

"Information Submission Form" in Appl. No. JP P2019-532880 by *Denka Company Limited*, pp. 1-8 (Feb. 10, 2022).
Goto et al., "Phenols and Carbon Compounds as Efficient Organic Catalysts for Reversible Chain Transfer Catalyzed Living Radical Polymerization (RTCP)", *Macromolecules*, vol. 43, pp. 7971-7978 (Sep. 1, 2010).
"KarenzMOI(R)", *Showa Denko K.K.*, pp. 1-2 (Apr. 12, 2022).
"Catalogue of Acrylic Products", *Toagosei*, pp. 1-3 (Nov. 2016).
Japan Patent Office, Office Action in Japanese Patent Application No. P2019-532880 (dated Apr. 12, 2022).

* cited by examiner

POLYMER MANUFACTURING METHOD

CROSS-REFERENCE TO RELATED APPLICATIONS

This patent application is the U.S. national phase of International Application No. PCT/JP2018/028225, filed on Jul. 27, 2018, which claims the benefit of Japanese Patent Application No. 2017-146591, filed Jul. 28, 2017, the disclosures of which are incorporated herein by reference in their entireties for all purposes.

TECHNICAL FIELD

The present invention relates to a polymer manufacturing method. More specifically, the present invention relates to a polymer manufacturing method in which living radical polymerization is performed using an oxygen radical scavenger.

BACKGROUND ART

Living radical polymerization is a polymerization method characterized in that cleavage and extension of a dormant end is repeated and a polymer chain sequentially extends. When living radical polymerization is performed in the presence of a radical scavenger, polymerization controllability generally lowers because the radical scavenger captures an extending radical, and the molecular weight distribution of a polymer to be obtained becomes broad. Patent Literature 1 mentions that polymerization under an air atmosphere is suppressed by addition of a radical polymerization inhibitor.

In order to prevent lowering in the polymerization controllability caused by the radical scavenger, a measure may be taken to remove the radical scavenger before the start of living radical polymerization. In Patent Literature 2, described is a procedure in which a polymerization inhibitor (radical scavenger) is removed through an alumina column, and then, living radical polymerization is performed.

CITATION LIST

Patent Literature

Patent Literature 1: Japanese Unexamined Patent Publication No. 2005-330446
Patent Literature 2: Japanese Unexamined Patent Publication No. 2015-117356

SUMMARY OF INVENTION

Technical Problem

However, lowering in the polymerization controllability is not sufficiently suppressed by conventional techniques, and it has been difficult to obtain a polymer having a narrow molecular weight distribution by living radical polymerization in some cases.

Then, it is a primary object of the present invention to provide a polymer having a narrow molecular weight distribution by living radical polymerization.

Solution to Problem

As mentioned above, it is known that, when living radical polymerization is performed with a radical scavenger added, the polymerization controllability lowers, and a polymer having a broad molecular weight distribution is manufactured. The present inventor, however, has intensively studied in order to solve the above problems and, as a result, has completely unexpectedly found that a polymer having a narrow molecular weight distribution can be obtained by adding an oxygen radical scavenger at a concentration higher than a conventional concentration, having completed the present invention.

That is, the present invention provides a polymer manufacturing method comprising a step of performing living radical polymerization using 0.005 to 0.5 parts by mass of an oxygen radical scavenger per 100 parts by mass of a radical polymerizable monomer.

The oxygen radical scavenger may contain a phenolic compound.

The phenolic compound may contain butylated hydroxytoluene.

The radical polymerizable monomer may contain a diene-based monomer.

The diene-based monomer may contain chloroprene.

The diene-based monomer may contain chloroprene and at least one selected from the group consisting of 2,3-dichloro-1,3-butadiene, 1-chloro-1,3-butadiene, isoprene, and butadiene.

The radical polymerizable monomer may contain chloroprene and acrylonitrile.

The living radical polymerization may be reversible addition-fragmentation chain transfer polymerization (RAFT polymerization).

The reversible addition-fragmentation chain transfer polymerization (RAFT polymerization) may be performed in the presence of a chain transfer agent (CTA) represented by the following chemical formula (I) or (II):

[Chemical Formula 1]

(I)

[Chemical Formula 2]

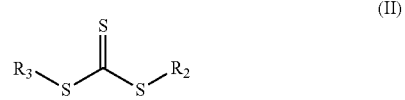

(II)

wherein in the chemical formula (I), $R_1$ represents hydrogen, chlorine, a substituted or unsubstituted alkyl group, a substituted or unsubstituted alkenyl group, a substituted or unsubstituted aryl group, or a substituted or unsubstituted heterocyclyl group, and in the chemical formula (I) and (II), $R_2$ to $R_4$ each independently represent a substituted or unsubstituted alkyl group, a substituted or unsubstituted saturated, unsaturated, or aromatic carbocycle, a substituted or unsubstituted saturated, unsaturated, or aromatic heterocycle, an organometallic species, or any polymer chain.

Advantageous Effects of Invention

According to the present invention, it is possible to obtain a polymer having a narrow molecular weight distribution using living radical polymerization.

DESCRIPTION OF EMBODIMENTS

Hereinbelow, an embodiment for implementing the present invention will be described. Note that the embodiment described below illustrates a representative embodiment of the present invention, and the scope of the present invention is not narrowly interpreted due to the embodiment.

A polymer manufacturing method according to the present embodiment comprises a step of living radical polymerizing a radical polymerizable monomer in the presence of an oxygen radical scavenger, wherein 0.005 to 0.5 parts by mass of the oxygen radical scavenger is used per 100 parts by mass of the radical polymerizable monomer. As the oxygen radical scavenger, a known one can be used, but a phenolic compound is preferably used.

The above radical polymerizable monomer is not particularly limited as long as being a radical polymerizable monomer. One radical polymerizable monomer may be used independently, and two or more radical polymerizable monomers may be used in combination. As the radical polymerizable monomer, at least one selected from the group consisting of a diene-based monomer, acrylic acid, an acrylate, methacrylic acid, a methacrylate, acrylamide, acrylonitrile, styrene, and a styrene derivative is preferred, and the diene-based monomer is more preferred among these. As the diene-based monomer, at least one selected from the group consisting of chloroprene, isoprene, butadiene, 2,3-dichloro-1,3-butadiene, and 1-chloro-1,3-butadiene is preferred, and chloroprene is more preferred among these.

When chloroprene and a monomer other than chloroprene are used as the above diene-based monomer, it is preferred that the above diene-based monomer be chloroprene and at least one selected from the group consisting of 2,3-dichloro-1,3-butadiene, 1-chloro-1,3-butadiene, isoprene, and butadiene. Additionally, when chloroprene and a monomer other than chloroprene are used as the above radical polymerizable monomer, it is preferred that the above radical polymerizable monomer contain chloroprene and acrylonitrile.

As the phenolic compound to be used in the manufacturing method of the present embodiment, any known phenolic compound can be used as long as being a phenolic radical scavenger for capturing an extending radical in living radical polymerization. The phenolic compound is used at a ratio of 0.005 to 0.5 parts by mass per 100 parts by mass of the radical polymerizable monomer. With less than 0.005 parts by mass, the molecular weight distribution of a polymer to be obtained will be broad. With more than 0.5 parts by mass, the polymerization ratio does not exceed 5% even when the polymerization reaction is performed for 8 hours or more, and the polymerization reaction does not substantially proceed.

The above phenolic compound is not particularly limited, but is preferably a compound represented by the following chemical formula (III) or (IV).

[Chemical Formula 3]

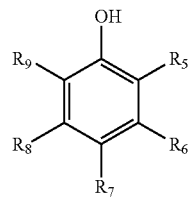

(III)

In the chemical formula (III), $R_5$ to $R_9$ each independently represent hydrogen, a hydroxyl group, a halogen, a substituted or unsubstituted alkyl group having 1 to 25 carbon atoms, a substituted or unsubstituted alkoxy group having 1 to 25 carbon atoms, or a substituted or unsubstituted alkoxycarbonyl group having 1 to 25 carbon atoms.

[Chemical Formula 4]

(IV)

[Chemical Formula 5]

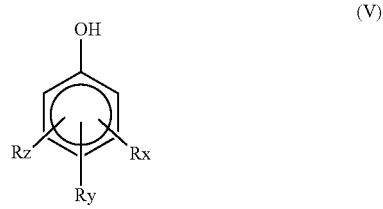

(V)

In the chemical formula (IV), the wavy line represents a site for bonding with a structure represented by the chemical formula (V), L represents a linking group, and n is an integer of 1 to 3. In the chemical formula (V), Rx, Ry, and Rz each independently represent hydrogen, a hydroxyl group, a halogen, a substituted or unsubstituted alkyl group having 1 to 25 carbon atoms, a substituted or unsubstituted alkoxy group having 1 to 25 carbon atoms, or a substituted or unsubstituted alkoxycarbonyl group having 1 to 25 carbon atoms. Any one of Rx, Ry, and Rz is substituted with the linking group L, and the linking group L may be substituted via sulfur, a substituted or unsubstituted alkyl group having 1 to 25 carbon atoms, a substituted or unsubstituted alkoxy group having 1 to 25 carbon atoms, or a substituted or unsubstituted alkoxycarbonyl group having 1 to 25 carbon atoms. The linking group L represents sulfur, a substituted or unsubstituted alkyl group having 1 to 25 carbon atoms, or a structure represented by the following chemical formulas (VI) to (X).

[Chemical Formula 6]

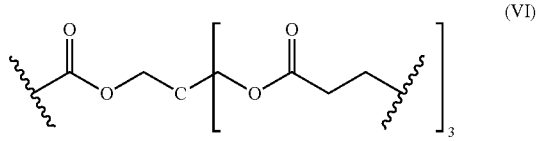

(VI)

[Chemical Formula 7]

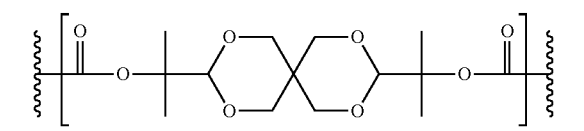

(VII)

[Chemical Formula 8]

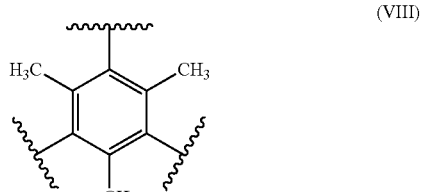

(VIII)

[Chemical Formula 9]

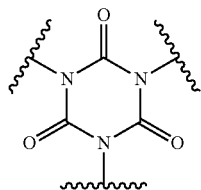

(IX)

[Chemical Formula 10]

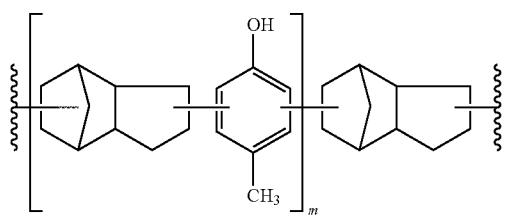

(X)

In the chemical formula (X), m is an integer of 1 or more.

As the compound represented by the above chemical formula (III), butylated hydroxytoluene (also referred to as: 2,6-di-tert-butyl-p-cresol, BHT), tert-butylcatechol, hydroquinone, tert-butylhydroquinone, 2,6-di-tert-butylphenol, 4-methoxyphenol, mono (or di, or tri) (α-methylbenzyl)phenol, 2,5-di-tert-amylhydroquinone, and 2,5-di-tert-butylhydroquinone are preferred.

As the compound represented by the above chemical formula (IV), preferred are a butylated reaction product of p-cresol and dicyclopentadiene, 4,4'-thiobis(3-methyl-6-tert-butylphenol), 4,4'-butylidenebis(3-methyl-6-tert-butylphenol), 2,2'-methylenebis(4-methyl-6-tert-butylphenol), 2,2'-methylenebis(4-ethyl-6-tert-butylphenol), tris(4-tert-butyl-3-hydroxy-2,6-dimethylbenzyl)isocyanurate, 1,1,3-tris(2-methyl-4-hydroxy-5-tert-butylphenyl)butane, stearyl 3-(3,5-di-tert-butyl-4-hydroxyphenyl)propionate, pentaerythritol tetrakis[3-(3,5-di-tert-butyl-4-hydroxyphenyl)propionate], 2,4,8,10-tetraoxaspiro[5.5]undecane-3,9-diylbis-2-methyl-2,1-propanediylbis{3-[4-hydroxy-3-methyl-5-(2-methyl-2-propanyl)phenyl]propanoate}, and 1,3,5-trimethyl-2,4,6-tris(3,5-di-tert-butyl-4-hydroxybenzyl)benzene.

Among these compounds, butylated hydroxytoluene is preferred as the phenolic compound.

As the living radical polymerization in the manufacturing method of the present embodiment, reversible addition-fragmentation chain transfer polymerization (RAFT polymerization) is preferred from the viewpoint of obtaining a polymer having a relatively narrow molecular weight distribution. For this reason, in the manufacturing method of the present embodiment, polymerization is performed in the presence of a chain transfer agent (CTA). As the chain transfer agent (CTA), a known RAFT agent can be preferably used. More preferably, an RAFT agent represented by the following chemical formula (I) or (II) is used as the chain transfer agent (CTA).

[Chemical Formula 11]

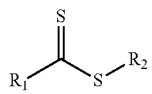

(I)

[Chemical Formula 12]

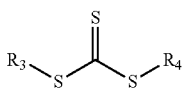

(II)

In the chemical formula (I), $R_1$ represents hydrogen, chlorine, a substituted or unsubstituted alkyl group, a substituted or unsubstituted alkenyl group, a substituted or unsubstituted aryl group, or a substituted or unsubstituted heterocyclyl group. Preferred examples of $R_1$ include a pyrrole group, a pyrazole group, a pyridyl group, a p-methoxyphenyl group, and a p-N,N-dimethylaminophenyl group. In the chemical formula (I) and (II), $R_2$ to $R_4$ each independently represent a substituted or unsubstituted alkyl group, a substituted or unsubstituted saturated, unsaturated, or aromatic carbocycle, a substituted or unsubstituted saturated, unsaturated, or aromatic heterocycle, an organometallic species, or any polymer chain. Preferred examples of $R_2$ to $R_4$ each independently include a benzyl group, a butyl group, a dodecyl group, a 2-cyano-2-propyl group, and a cyanomethyl group.

The RAFT agent represented by the above chemical formula (I) is not particularly limited, and a common compound can be used. Examples thereof include dithiocarbamates and dithioesters. Among these, because of being excellent in polymerization controllability, preferred are benzyl 1-pyrrolecarbodithioate (also referred to as: benzyl 1-pyrroledithiocarbamate), 1-benzyl-N,N dimethyl-4-aminodithiobenzoate, 1-benzyl-4-methoxydithiobenzoate, 1-phenylethyl imidazoledithiocarbamate (also referred to as: 1-phenylethyl imidazolecarbodithioate), benzyl-1-(2-pyrrolidinone)dithiocarbamate (also referred to as: benzyl-1-(2-pyrrolidinone)carbodithioate), benzyl phthalimidyl dithiocarbamate (also referred to as: benzyl phthalimidyl carbodithioate), 2-cyanoprop-2-yl-1-pyrroledithiocarbamate (also referred to as: 2-cyanoprop-2-yl-1-pyrrolecarbodithioate), 2-cyanobut-2-yl-1-pyrroledithiocarbamate (also referred to as: 2-cyanobut-2-yl-1-pyrrolecarbodithioate), benzyl-1-imidazole dithiocarbamate (also referred to as: benzyl-1-imidazole carbodithioate), 2-cyanoprop-2-yl-N,N-dimethyldithiocarbamate, benzyl-N,N-diethyldithiocarbamate, cyanomethyl-1-(2-pyrrolidone)dithiocarbamate, 2-(ethoxycarbonylbenzyl)prop-2-yl-N,N-diethyldithiocarbamate, benzyldithioate, 1-phenylethyldithiobenzoate, 2-phenylprop-2-yldithiobenzoate, 1-acetic acid-1-yl-ethyl-dithiobenzoate, 1-(4-methoxyphenyl)ethyldithiobenzoate, benzyldithioacetate, ethoxycarbonylmethyl dithioacetate, 2-(ethoxycarbonyl)prop-2-yldithiobenzoate, 2-cyanoprop-2-yldithiobenzoate, dithiobenzoate, tert-butyldithiobenzoate, 2,4,4-trimethylpent-2-yldithiobenzoate, 2-(4-chlorophenyl)-prop-2-yldithiobenzoate, 3-vinylbenzyldithiobenzoate, 4-vinylbenzyldithiobenzoate, benzyldiethoxyphosphinyl dithioformate, tert-butyl trithioperbenzoate, 2-phenylprop-2-yl-4-chlorodithiobenzoate, naphthalene-1-carboxylic acid-1-methyl-1-phenyl-ethylester, 4-cyano-4-methyl-4-thiobenzyl sulfanyl butyric acid, dibenzyl tetrathioterephthalate, carboxymethyl dithiobenzoate, poly(ethylene oxide) having a dithiobenzoate terminal group, poly(ethylene oxide) having a 4-cyano-4-methyl-4-thiobenzyl sulfanyl butyric acid terminal group, 2-[(2-phenylethanethioyl)sulfanyl]propionic acid, 2-[(2-phenylethanethioyl)sulfanyl]succinic acid, 3,5-dimethyl-1H-pyrazole-1-carbodithioate potassium, cyanomethyl-3,5-dimethyl-1H-pyrazole-1-carbodithioate, cyanomethylmethyl-(phenyl)dithiocarbamate, benzyl-4-chlorodithiobenzoate, phenylmethyl-4-chlorodithiobenzoate, 4-nitrobenzyl-4-chlorodithiobenzoate, phenylprop-2-yl-4-chlorodithiobenzoate, 1-cyano-1-methylethyl-4-chlorodithiobenzoate, 3-chloro-2-butenyl-4-chlorodithiobenzoate, 2-chloro-2-butenyldithiobenzoate, benzyl dithioacetate, 3-chloro-2-butenyl-1H-pyrrole-1-dithiocarboxylic acid, 2-cyanobutan-2-yl 4-chloro-3,5-dimethyl-1H-pyrazole-1-carbodithioate, and cyanomethylmethyl(phenyl)carbamodithioate. Among these, more preferred are benzyl 1-pyrrolecarbodithioate, 1-benzyl-N,N dimethyl-4-aminodithiobenzoate, and 1-benzyl-4-methoxydithiobenzoate.

Examples of the RAFT agent represented by the above chemical formula (II) include trithiocarbonates such as 2-cyano-2-propyldodecyltrithiocarbonate, dibenzyltrithiocarbonate, butylbenzyltrithiocarbonate, 2-[[(butylthio)thioxomethyl]thio]propionic acid, 2-[[(dodecylthio)thioxomethyl]thio]propionic acid, 2-[[(butylthio)thioxomethyl]thio]succinic acid, 2-[[(dodecylthio)thioxomethyl]thio]succinic acid, 2-[[(dodecylthio)thioxomethyl]thio]-2-methylpropionic acid, 2,2'-[carbonothioylbis(thio)]bis[2-methylpropionic acid], 2-amino-1-methyl-2-oxoethylbutyltrithiocarbonate, benzyl 2-[(2-hydroxyethyl)amino]-1-methyl-2-oxoethyltrithiocarbonate, 3-[[[(tert-butypthio]thioxomethyl]thio]propionic acid, cyanomethyldodecyltrithiocarbonate, diethylaminobenzyltrithiocarbonate, and dibutylaminobenzyltrithiocarbonate. Among these, because of being excellent in polymerization controllability, preferred are butylbenzyltrithiocarbonate and dibenzyltrithiocarbonate, and more preferred is butylbenzyltrithiocarbonate.

It is preferred that the amount of the chain transfer agent, from the viewpoint of obtaining a polymer having a narrow molecular weight distribution, be adjusted such that the ratio of the amount of substance of the radical polymerizable monomer ($M_0$) to that of the chain transfer agent (CTA) ($M_0$/CTA) at the start of polymerization is in the range of 5/1 to 500/1. The value of $M_0$/CTA is more preferably 100/1 to 300/1.

Examples of the radical polymerization initiator to be used in RAFT polymerization include organic peroxides such as benzoyl peroxide and isobutyl peroxide and azo compounds such as azobisisobutyronitrile and 4-methoxyazobisvaleronitrile. These may be used singly or in combinations of two or more. It is preferred that the amount of the radical polymerization initiator be adjusted such that the ratio of the amount of the substance of the above chain transfer agent (CTA) to that of the above radical polymerization initiator (I) (CTA/I) is in the range of 1/5 to 1/0.001.

Examples of the polymerization mode of living radical polymerization include solution polymerization, bulk polymerization, suspension polymerization, and emulsion polymerization, and among these, emulsion polymerization is preferred.

The emulsifier to be used in emulsion polymerization is not particularly limited, but from the view point of emulsification stability, an anionic or nonionic emulsifier is preferred. Especially, for the reason that it is possible to prevent excessive contraction and breakage by allowing a film-like rubber, which is obtained by freeze coagulation and drying after finish of the polymerization, to have moderate strength, it is preferred to use an alkali metal rosinate. A rosin acid is a mixture of a resin acid, a fatty acid, and the like. As the resin acid, abietic acid, neoabietic acid, palustric acid, pimaric acid, isopimaric acid, dehydroabietic acid, dihydropimaric acid, dihydroisopimaric acid, secodehydroabietic acid, dihydroabietic acid or the like is included, and as the fatty acid, oleic acid, linoleic acid or the like is included.

The composition of these components, which varies depending on the difference in collection methods of rosins, which are classified into gum rosins, wood rosins, and tall rosins, the production area and type of pines, distillation purification, and disproportionation reaction, is not particularly limited. Considering the emulsification stability and ease of handling, the emulsifier is preferably sodium rosinate or potassium rosinate.

The amount of the emulsifier is preferably 1.0 to 10.0 parts by mass, more preferably 2.0 to 5.0 parts by mass per 100 parts by mass of the radical polymerizable monomer, from the viewpoint of an emulsified state.

It is preferred that the above emulsifier be at the critical micelle concentration or more. This is because, when the emulsifier at the critical micelle concentration or more is used to perform living radical polymerization, it is possible to form micelles in the polymerization system to thereby stably disperse the monomer in water, and additionally, coalescence no longer occurs even if stirring is stopped after finish of the polymerization.

The polymerization temperature in the living radical polymerization is not particularly limited, but is preferably 5 to 55° C., more preferably 10 to 55° C., more preferably 35 to 55° C., from the viewpoint of enhancing polymerization controllability to thereby obtain a polymer having a narrow molecular weight distribution. Generally, the higher the polymerization temperature, the broader the molecular weight distribution of a polymer tends to become. However, the manufacturing method of the present embodiment is excellent in polymerization controllability, and thus, a polymer having a narrow molecular weight distribution may be obtained even at a high polymerization temperature. Additionally, emulsion polymerization can be performed under normal pressure by setting the polymerization temperature to 5 to 55° C. to thereby enhance productivity. Meanwhile, the boiling point of chloroprene, one of radical polymerizable polymers, is about 59° C., and thus, setting the polymerization temperature to 55° C. or less is preferred because influence of hydrolysis of the chain transfer agent on a living property and evaporation of the monomer are no longer required to be considered.

In the most preferred manufacturing method of the present embodiment, it is preferred that a solution (A) in which 0.005 to 0.5 parts by mass of an oxygen radical scavenger, preferably a phenolic compound and a chain transfer agent (CTA) represented by the above chemical formula (I) or (II) are added per 100 parts by mass of a radical polymerizable monomer ($M_0$) to thereby achieve the ratio of the amount of substance of the above radical polymerizable monomer to that of the chain transfer agent (CTA) at the start of polymerization ($M_0$/CTA) of 5/1 to 500/1 and 500 to 5000 parts by mass of an aqueous solution B of 0.1 to 10% by mass of an emulsifier be mixed, emulsion polymerization be performed and then radical polymerization be performed, and when the polymerization ratio reaches 20 to 50%, 100 to 5000 parts by mass of the radical polymerizable monomer be additionally added. It is possible to enhance polymerization controllability to thereby obtain a polymer having a narrow molecular weight distribution by adjusting the ratio to $M_0$/CTA=5/1 to 500/1. The value of $M_0$/CTA is more preferably 100/1 to 300/1. The radical polymerizable monomer to be additionally added is more preferably 250 to 3000 parts by mass.

In the manufacturing method of the present embodiment, the oxygen radical scavenger may be added at once in the initial stage or may be additionally added.

The final polymerization ratio in the living radical polymerization is preferably 40 to 95%, more preferably 50 to 80% in order to enhance productivity and prevent gelling of the polymer. Adjustment of the final polymerization ratio may be performed by adding a polymerization inhibitor to terminate the polymerization reaction. Examples of the polymerization inhibitor include oil-soluble polymerization inhibitors such as thiodiphenylamine, 4-tertiary butylcatechol, and 2,2-methylenebis-4-methyl-6-tertiary butyl phenol and a water-soluble polymerization inhibitor such as diethylhydroxylamine.

In the manufacturing method of the present embodiment, removal of an unreacted monomer after the living radical polymerization should be performed by a known method such as heating under reduced pressure. Thereafter, the pH is adjusted, steps such as freeze coagulation, washing with water, and hot air drying are performed, and a solid polymer should be collected.

EXAMPLES

Hereinbelow, the present invention will be further described in detail on the basis of Examples. Note that Examples described below illustrate an exemplary representative example of the present invention, the present invention is not intended to be limited to the following Examples.

Manufacture of Polymer

Example 1

(Production of Chloroprene Polymer Latex)

In a 500 ml three-necked separable flask, 50 mg of sodium hydroxide, 1.0 g of condensation product soda of naphthalenesulfonic acid and formalin, 4.43 g of a disproportionated tall rosin potassium salt were dissolved in 100 g of water, and degassing by means of a nitrogen flow was performed for 10 minutes while kept at 30° C. by an oil bath. Then, 10 g of a chloroprene monomer from which the stabilizer had been removed by distillation under reduced pressure, 1.5 g of butylbenzyltrithiocarbonate, and 0.01 g of butylated hydroxytoluene were added to the above separable flask and emulsified in a 30° C. oil bath for 10 minutes. The emulsion obtained was warmed to 35° C., 1.41 g of a 2.0% potassium persulfate aqueous solution was added thereto, and polymerization was started. When the polymerization ratio of the initial monomer reached 30%, 90 g of the chloroprene monomer was additionally added over 2 hours, and polymerization was performed until the final polymerization ratio reached 60%. The polymerization reaction was terminated by adding a 10.0% by weight N,N-diethylhydroxylamine aqueous solution, and the residual chloroprene monomer was removed by distillation under reduced pressure. In accordance with the above procedure, a chloroprene polymer latex was obtained.

(Calculation of Polymerization Ratio)

The polymerization ratio from the start of the polymerization to a certain time was calculated from a dry weight (solid concentration), which was determined after the chloroprene polymer latex was heated and air dried. Specifically, the polymerization ratio was calculated by the following expression. In the expression, the solid concentration is the concentration (% by mass) of the solid, which is obtained by heating 2 g of a sampled emulsion polymerization liquid at 130° C. to remove the solvent (water), volatile chemicals and raw materials and removing the volatiles from the difference between the weight before and the weight after the heating. The total amount fed and the evaporation residue were calculated from the polymerization formulation. The total amount fed is the total amount of the raw materials, reagent, and solvent (water) fed from the start of the polymerization to a certain time. The evaporation residue represents the weight of chemicals remaining, without volatilizing under a 130° C. condition, along with the polymer, as the solid, among the chemicals and raw materials fed from the start of the polymerization to a certain time. The amount of the monomer fed is the total amount of the monomer initially fed and the monomer fed from the start of the polymerization to a certain time. Note that, in the case of copolymerization of the chloroprene monomer and other monomer, the amount of the monomer fed is the total amount of these monomers.

Polymerization ratio [%]{(total amount fed [g]×solid concentration [% by mass]/100)−(evaporation residue [g])}/amount of the monomer fed [g]× 100

(Dry-Up of Chloroprene Polymer)

The chloroprene polymer latex obtained was adjusted to pH 7.0, poured onto a metal plate cooled to −20° C., and demulsified by freeze coagulation, The resulting sheet was washed with water and dried at 130° C. for 15 minutes to thereby obtain a solid chloroprene polymer of Example 1.

Example 2

A chloroprene polymer of Example 2 was obtained in the same manner as in Example 1 except that the amount of butylated hydroxytoluene added was changed to 0.5 g.

Example 3

A chloroprene polymer of Example 3 was obtained in the same manner as in Example 1 except that the amount of butylated hydroxytoluene added was changed to 0.05 g.

Example 4

A chloroprene polymer of Example 4 was obtained in the same manner as in Example 1 except that the amount of butylated hydroxytoluene added was changed to 0.005 g.

Example 5

A chloroprene polymer of Example 5 was obtained in the same manner as in Example 1 except that 1.5 g of butylbenzyltrithiocarbonate was changed to 1.8 g of dibenzyltrithiocarbonate.

Example 6

A chloroprene polymer of Example 6 was obtained in the same manner as in Example 1 except that 1.5 g of butylbenzyltrithiocarbonate was changed to 1.8 g of 1-benzyl-N,N dimethyl-4-aminodithiobenzoate.

Example 7

A chloroprene polymer of Example 7 was obtained in the same manner as in Example 1 except that 1.5 g of butylbenzyltrithiocarbonate was changed to 1.3 g of 1-benzyl-4-methoxydithiobenzoate.

Example 8

A chloroprene polymer of Example 8 was obtained in the same manner as in Example 1 except that 1.5 g of butylbenzyltrithiocarbonate was changed to 1.5 g of benzyl 1-pyrrolecarbodithioate.

Example 9

A copolymer of a chloroprene monomer and a 2,3-dichloro-1,3-butadiene monomer, of Example 9, was obtained in the same manner as in Example 1 except that 10 g of the initial chloroprene monomer was changed to 8 g of the chloroprene monomer and 2 g of the 2,3-dichloro-1,3-butadiene monomer, 90 g of the chloroprene monomer additionally added was changed to 72 g of the chloroprene monomer and 18 g of the 2,3-dichloro-1,3-butadiene monomer, and the polymerization temperature was changed from 35° C. to 50° C.

Example 10

A copolymer of a chloroprene monomer and a 1-chloro-1,3-butadiene monomer, of Example 10, was obtained in the same manner as in Example 1 except that 10 g of the initial chloroprene monomer was changed to 9.5 g of the chloroprene monomer and 0.5 g of the 1-chloro-1,3-butadiene monomer and 90 g of the chloroprene monomer additionally added was changed to 85.5 g of the chloroprene monomer and 4.5 g of the 1-chloro-1,3-butadiene monomer.

Example 11

A chloroprene polymer of Example 11 was obtained in the same manner as in Example 1 except that the polymerization temperature was changed from 35° C. to 10° C.

Comparative Example 1

A chloroprene polymer of Comparative Example 1 was obtained in the same manner as in Example 1 except that the amount of butylated hydroxytoluene added was changed to 0 g.

Comparative Example 2

A chloroprene polymer of Comparative Example 2 was obtained in the same manner as in Example 1 except that the amount of butylated hydroxytoluene added was changed to 0.0001 g.

Comparative Example 3

A chloroprene polymer of Comparative Example 3 was obtained in the same manner as in Example 1 except that the amount of butylated hydroxytoluene added was changed to 0.003 g.

Comparative Example 4

The polymerization was performed in the same manner as in Example 1 except that the amount of butylated hydroxytoluene added was changed to 1.0 g. However, the progress of the polymerization was slow, the polymerization ratio after 8 hours of the polymerization was 5% or less, and thus, the chloroprene polymer was scarcely obtained.

Comparative Example 5

The polymerization was performed in the same manner as in Example 1 except that the amount of butylated hydroxytoluene added was changed to 2.0 g. However, the progress of the polymerization was slow, the polymerization ratio after 8 hours of the polymerization was 5% or less, and thus, the chloroprene polymer was scarcely obtained.

Comparative Example 6

A chloroprene polymer of Comparative Example 6 was obtained in the same manner as in Example 1 except that the polymerization temperature was changed from 35° C. to 10° C. and the amount of butylated hydroxytoluene added was changed to 0 g.

Comparative Example 7

10 g of the initial chloroprene monomer was changed to 8 g of the chloroprene monomer and 2 g of the 2,3-dichloro-1,3-butadiene monomer, and the amount of butylated hydroxytoluene added was changed to 0 g. Additionally, 90 g of the chloroprene monomer additionally added was changed to 72 g of the chloroprene monomer and 18 g of the 2,3-dichloro-1,3-butadiene monomer, and the polymerization temperature was changed from 35° C. to 50° C. A copolymer of the chloroprene monomer and the 2,3-dichloro-1,3-butadiene monomer, of Comparative Example 7, was obtained in the same manner as in Example 1 except those described above.

<Evaluation>

The number average molecular weight Mn, the mass average molecular weight Mw, and the molecular weight distribution (Mw/Mn) of the polymer were, after the sample adjustment concentration was set to 0.1% by mass using MT, measured by TOSOH HLC-8320GPC (in terms of standard polystyrene).

At this time, using a TSK guard column HHR-H as a precolumn and three HSKgelGMHHR-H's as analysis columns, the sample was allowed to flow out at a sample pump pressure of 8.0 to 9.5 MPa, a flow rate of 1 ml/min, and 40° C. and detected with a differential refractometer.

For the efflux time and the molecular weight, used was a calibration curve produced by measuring a total of 9 standard polystyrene samples of which molecular weight was known as mentioned below: (Mw=$8.42 \times 10^6$, $1.09 \times 10^6$, $7.06 \times 10^5$, $4.27 \times 10^5$, $1.90 \times 10^5$, $9.64 \times 10^4$, $3.79 \times 10^4$, $1.74 \times 10^4$, $2.63 \times 10^3$).

In Comparative Examples 4 and 5, in which the polymer was scarcely obtained, measurement of the number average molecule weight and the weight average molecular weight was not performed.

The results of Examples and Comparative Examples are shown in Table 1.

TABLE 1

| Example |
| --- |

TABLE 1-continued

|  | 1 | 2 | 3 | 4 | 5 | 6 | 7 | 8 | 9 | 10 | 11 |
|---|---|---|---|---|---|---|---|---|---|---|---|
| Chloroprene (initial) (g) | 10 | 10 | 10 | 10 | 10 | 10 | 10 | 10 | 8 | 9.5 | 10 |
| Chloroprene (additionally added) (g) | 90 | 90 | 90 | 90 | 90 | 90 | 90 | 90 | 72 | 85.5 | 90 |
| 2,3-Dichloro-1,3-butadiene (initial) (g) | 0 | 0 | 0 | 0 | 0 | 0 | 0 | 0 | 2 | 0 | 0 |
| 2,3-Dichloro-1,3-butadiene (additionally added) (g) | 0 | 0 | 0 | 0 | 0 | 0 | 0 | 0 | 18 | 0 | 0 |
| 1-Chloro-1,3-butadiene (initial) (g) | 0 | 0 | 0 | 0 | 0 | 0 | 0 | 0 | 0 | 0.5 | 0 |
| 1-Chloro-1,3-butadiene (additionally added) (g) | 0 | 0 | 0 | 0 | 0 | 0 | 0 | 0 | 0 | 4.5 | 0 |
| Butylated hydroxytoluene (g) | 0.01 | 0.5 | 0.05 | 0.005 | 0.01 | 0.01 | 0.01 | 0.01 | 0.01 | 0.01 | 0.01 |
| Polymerization temperature (° C.) | 35 | 35 | 35 | 35 | 35 | 35 | 35 | 35 | 50 | 35 | 10 |
| Mn($10^4$ g/mol) | 17.0 | 17.5 | 18 | 22.3 | 13.7 | 3.6 | 17.2 | 15.7 | 18.9 | 16.0 | 18.2 |
| Mw($10^4$ g/mol) | 34.8 | 35.2 | 36.5 | 47.1 | 30.3 | 6.7 | 38.4 | 31.8 | 42.1 | 32.3 | 36.1 |
| Mw/Mn | 2.0 | 2.0 | 2.0 | 2.1 | 2.2 | 1.8 | 2.2 | 2.0 | 2.2 | 2.0 | 2.0 |

|  | Comparative Example ||||||| 
|---|---|---|---|---|---|---|---|
|  | 1 | 2 | 3 | 4 | 5 | 6 | 7 |
| Chloroprene (initial) (g) | 10 | 10 | 10 | 10 | 10 | 10 | 8 |
| Chloroprene (additionally added) (g) | 90 | 90 | 90 | 90 | 90 | 90 | 72 |
| 2,3-Dichloro-1,3-butadiene (initial) (g) | 0 | 0 | 0 | 0 | 0 | 0 | 2 |
| 2,3-Dichloro-1,3-butadiene (additionally added) (g) | 0 | 0 | 0 | 0 | 0 | 0 | 18 |
| 1-Chloro-1,3-butadiene (initial) (g) | 0 | 0 | 0 | 0 | 0 | 0 | 0 |
| 1-Chloro-1,3-butadiene (additionally added) (g) | 0 | 0 | 0 | 0 | 0 | 0 | 0 |
| Butylated hydroxytoluene (g) | 0 | 0.0001 | 0.003 | 1.0 | 2.0 | 0 | 0 |
| Polymerization temperature (° C.) | 35 | 35 | 35 | 35 | 35 | 10 | 50 |
| Mn($10^4$ g/mol) | 23 | 22 | 23 | Not measured | Not measured | 19.6 | 17.9 |
| Mw($10^4$ g/mol) | 64.4 | 61.8 | 59.4 | | | 47.3 | 50.1 |
| Mw/Mn | 2.8 | 2.8 | 2.6 | | | 2.4 | 2.8 |

From these results, it was confirmed that a polymer having a narrow molecular weight distribution can be obtained in accordance with the present invention.

The present invention can also take aspects as follows.

[1] A polymer manufacturing method comprising:
a step of performing living radical polymerization using 0.005 to 0.5 parts by mass of an oxygen radical scavenger per 100 parts by mass of a radical polymerizable monomer.

[2] The polymer manufacturing method according to [1], wherein the oxygen radical scavenger comprises a phenolic compound.

[3] The polymer manufacturing method according to [2], wherein the phenolic compound comprises butylated hydroxytoluene.

[4] The polymer manufacturing method according to any one of [1] to [3], wherein the radical polymerizable monomer comprises a diene-based monomer.

[5] The polymer manufacturing method according to [4], wherein the diene-based monomer comprises chloroprene.

[6] The polymer manufacturing method according to [4], wherein the diene-based monomer comprises
chloroprene and
at least one selected from the group consisting of 2,3-dichloro-1,3-butadiene, 1-chloro-1,3-butadiene, isoprene, and butadiene.

[7] The polymer manufacturing method according to any one of [1] to [6], wherein the radical polymerizable monomer comprises chloroprene and acrylonitrile.

[8] The polymer manufacturing method according to any one of [1] to [7], wherein the living radical polymerization is reversible addition-fragmentation chain transfer polymerization (RAFT polymerization).

[9] The polymer manufacturing method according to [8], wherein the polymerization is performed in the presence of a chain transfer agent (CTA) represented by the following chemical formula (I) or (II):

[Chemical Formula 13]

(I)

[Chemical Formula 14]

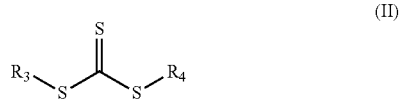

(II)

wherein in the chemical formula (I), $R_1$ represents hydrogen, chlorine, a substituted or unsubstituted alkyl group, a substituted or unsubstituted alkenyl group, a substituted or unsubstituted aryl group, or a substituted or unsubstituted heterocyclyl group, and in the chemical formula (I) and (II), $R_2$ to $R_4$ each independently represent a substituted or unsubstituted alkyl group, a substituted or unsubstituted saturated, unsaturated, or aromatic carbocycle, a substituted or unsubstituted saturated, unsaturated, or aromatic heterocycle, an organometallic species, or any polymer chain.

The invention claimed is:

1. A polymer manufacturing method comprising: a step of performing living radical polymerization in the presence of 0.005 to 0.5 parts by mass of an oxygen radical scavenger per 100 parts by mass of a radical polymerizable monomer, wherein the living radical polymerization is reversible addition-fragmentation chain transfer polymerization (RAFT polymerization).

2. The polymer manufacturing method according to claim 1, wherein the oxygen radical scavenger comprises a phenolic compound.

3. The polymer manufacturing method according to claim 2, wherein the phenolic compound comprises butylated hydroxytoluene.

4. The polymer manufacturing method according to claim 1, wherein the radical polymerizable monomer comprises a diene-based monomer.

5. The polymer manufacturing method according to claim 4, wherein the diene-based monomer comprises chloroprene.

6. The polymer manufacturing method according to claim 4, wherein the diene-based monomer comprises chloroprene and at least one selected from the group consisting of 2,3-dichloro-1,3-butadiene, 1-chloro-1,3-butadiene, isoprene, and butadiene.

7. The polymer manufacturing method according to claim 1, wherein the radical polymerizable monomer comprises chloroprene and acrylonitrile.

8. The polymer manufacturing method according to claim 1, wherein the polymerization is performed in the presence of a chain transfer agent (CTA) represented by the following chemical formula (I) or (II):

[Chemical Formula 1]

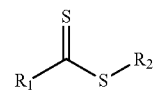

(I)

[Chemical Formula 2]

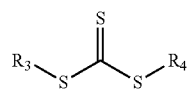

(II)

wherein in the chemical formula (I), $R_1$ represents hydrogen, chlorine, a substituted or unsubstituted alkyl group, a substituted or unsubstituted alkenyl group, a substituted or unsubstituted aryl group, or a substituted or unsubstituted heterocyclyl group; and in the chemical formula (I) and (II), $R_2$ to $R_4$ each independently represent a substituted or unsubstituted alkyl group, a substituted or unsubstituted saturated, unsaturated, or aromatic carbocycle, a substituted or unsubstituted saturated, unsaturated, or aromatic heterocycle, an organometallic species, or any polymer chain.

* * * * *